United States Patent [19]
Gupta et al.

[11] Patent Number: 5,206,899
[45] Date of Patent: Apr. 27, 1993

[54] ARRANGEMENT FOR OUTBOUND TELECOMMUNICATIONS

[75] Inventors: Alok K. Gupta, Marlboro; Patricia D. Saleh, Holmdel; Barry S. Seip, New Providence, all of N.J.

[73] Assignee: AT&T Bell Laboratories, Murray Hill, N.J.

[21] Appl. No.: 755,407

[22] Filed: Sep. 5, 1991

[51] Int. Cl.⁵ .................. H04M 3/42; H04M 15/16
[52] U.S. Cl. .................................. 379/120; 379/127; 379/243; 379/201
[58] Field of Search ............... 379/127, 243, 350, 201, 379/211, 119, 120

[56] References Cited

U.S. PATENT DOCUMENTS

| | | | |
|---|---|---|---|
| 4,313,035 | 1/1982 | Jordan . | |
| 4,754,479 | 6/1988 | Bicknell et al. | 379/207 |
| 4,899,373 | 2/1990 | Lee et al. | 379/207 |
| 5,012,511 | 4/1991 | Hank et al. | 379/201 X |

Primary Examiner—Stafford D. Schreyer
Attorney, Agent, or Firm—B. H. Freedman

[57] ABSTRACT

A subscriber can dynamically provision, i.e., assign desired characteristics to any "target station", which is an active phone accessible to a telecommunications network. A call thereafter originated from the target station (including a pay phone or a mobile phone) then can use customized features (for example, speed calling, conferencing, account code dialing) and take advantage of special corporate billing arrangements (for example, SDN, WATS and MEGACOM). The identity of the target station with respect to the communications network (e.g., the Automatic Number Identification (ANI) of the station) is not changed. Initially, a service profile is created and stored for each subscriber, containing information describing desired features and billing options. Thereafter, the characteristics of a particular target station are changed by an activation process that can be initiated from any location, whereby the ANI associated with the target station is entered into the ANI trigger table in an intelligent switch on which that station is homed, and the service profile is loaded into a database. When a call is originated in the target station, information in the database is applied to the switch to provide the desired characteristics.

20 Claims, 5 Drawing Sheets

| | |
|---|---|
| 400 | SUBSCRIBER ID # AND PIN |
| 401 | CALLING STATION ANI-NPA-NXX-YYYY |
| 402 | FEATURE 1 – BILLING CHARACTERISTICS |
| 403 | FEATURE 2 – SPEED DIALING |
| 404 | FEATURE 3 – CALL PICKUP |
| 405 | FEATURE 4 – OUT GOING SCREENING LIST |
| | ⋮ |
| 406 | FEATURE N – CALL TRANSFER |
| 407 | START   TIME/DATE |
| 408 | STOP    TIME/DATE |

ARRANGEMENT FOR OUTBOUND TELECOMMUNICATIONS

FIELD OF THE INVENTION

This invention relates generally to a system and method for the provision of outbound telecommunications services, and, more particularly, to such a system and method to provide a service by which a subscriber can, from any location, easily, quickly and on a real-time basis, personalize and/or change certain characteristics, such as billing options, of outbound telephone calls made from one or more "target stations". The identity of the target station with respect to the communications network (i.e., the Automatic Number Identification (ANI) of the station) is not changed.

BACKGROUND OF THE INVENTION

Recently, much attention has been given to the fact that telephone subscribers have dramatically increased mobility, so that there is a need to assure that calls directed TO the subscriber are forwarded to the destination at which s/he is located at the time the call is made. For example, U.S. Pat. No. 4,313,035 issued to Jordan et al. describes a Person Locator Service by which calls directed to a subscriber at home can be forwarded to the called party's office, car, hotel room, etc., depending upon the status of information contained in a database record that is updated when the subscriber is away from home. Application Ser. No. 07/607,925 filed Nov. 1, 1990, and assigned to the same assignee as the present invention, describes one approach for automatically updating the information stored in the database.

Despite the attention given to the re-direction of calls made TO a "mobile" telephone subscriber (as used herein, a "mobile" subscriber is a subscriber originating a call from a wired or wireless telephone that can change locations from home, car, boat, office, etc.—this term is not limited to a subscriber in a vehicle), little attention has been paid to the outbound calls made BY a mobile subscriber from stations other than the station normally used by that subscriber. For example, an employee of company X may wish to make business-related calls from his/her home. In that event, while individual calls could be billed to company X using a company credit card, the calls would be treated by the telecommunications network as being made from home and not the office, and would not have the "characteristics" of a call made from the office. Specifically, if the company, as a customer of a telecommunications provider, subscribed to a special billing arrangement such as WATS or MEGACOM or used a Software Defined Network, a call originated from home would not be entitled to corporate billing rates. In addition, if the telecommunications network was set up such that calls originating at the office phone were provided with features like speed dialing, outgoing call screening, wide area calling or any of a host of other services offered to telecommunications subscribers, these features would not be available from the home phone, unless advance arrangements were made. These arrangements, called provisioning, normally require a call to the telephone business office, and a relatively long period of time (usually hours to days) in order to effect the changes in the telephone switching equipment necessary to effectuate the desired changeover.

One arrangement for addressing certain needs of "mobile" subscribers (as defined above) is described in U.S. Pat. No. 4,899,373 issued to C. Lee et al. on Feb. 6, 1990. In the Lee arrangement, personalized feature data associated with a subscriber is stored in a database in association with a personal identification number (PIN). A subscriber wishing to use personalized features while away from home dials a special code from a target station connected to local exchange which has access to the database. When the PIN is validated, the feature data is retrieved from the database and stored in the local exchange from which the call was placed. Thereafter, telephone service initiated at the target station will be rendered to the subscriber with the desired personalized features.

While the Lee arrangement gives mobile subscribers the ability to temporarily change certain features of outgoing calls, the patented system does not contemplate providing a subscriber initiating a call at a target station with advanced billing options usually provided only at the home station. Also, the request for a change in call characteristics must be initiated from the particular target station that is to be changed. This means that a mobile subscriber cannot effectuate the desired changes remotely, in advance, before he or she reaches the destination at which the target station is located.

Furthermore, the Lee arrangement would be difficult to use when long distance calls are to be made from the target station, and the target station is distant from the subscriber's home station. This is because the patentee contemplates changing the Automatic Number Identification (ANI) information associated with the target station. Thus, with the Lee arrangement, when a long distance call is initiated from a target station that is distant from the subscriber's home station, the ANI associated with the home station will be forwarded from the local exchange to the toll switch serving the target station. This could create confusion and a possible operating problem, since each long distance (toll) switch has knowledge only of the ANIs for stations that "home" on that switch. In addition, use of the home station's ANI in the target station may cause a long distance call to be rated improperly, leading to incorrect charges.

SUMMARY OF THE INVENTION

The present invention is a method and apparatus for providing a service that allows a "mobile" subscriber (as defined previously) at any location to dynamically provision, i.e., assign personalized characteristics including advanced billing options and/or a set of custom features, to any "target station", which is an active phone accessible to a telecommunications network. A subscriber initiating a call from the target station (including a pay phone or a mobile phone) then retains the flexibility of his/her custom telecommunication environment, (for example, speed calling, conferencing, account code dialing) and can take advantage of special corporate billing arrangements (for example, SDN, WATS and MEGACOM). The identity of the target station with respect to the communications network (e.g., the Automatic Number Identification (ANI) of the station) is not changed.

The major network components of the present invention are: (1) One or more intelligent switches that provide special features and billing arrangements in accordance with a stored subscriber service profile presented to the switch. Each switch includes an Automatic Number Identification (ANI) trigger table which examines the ANI for each call routed to the switch, including calls originated by subscribers of the service contemplated by the present invention. If the ANI for a target station designated by a subscriber is in the trigger table, the stored profile is retrieved and the call is afforded special treatment in accordance with the information contained therein. (2) One or more query databases each associated with a particular switch and arranged to store a plurality of current subscriber service profiles. If desired, these service profiles can be loaded into and stay in the database only for the time period during which special, personalized features are to be provided with respect to calls originating at the target station. (3) An automated service center, called a customer processing center, that provides an interface to subscribers to initially create a personalized service profile desired by a subscriber and then to activate the service so that a target station can originate calls using the service profile. When the service is activated with respect to a particular target station, its ANI is included in the ANI trigger table in the switch on which that station homes, in real time, and the service profile is loaded into (or activated in) the associated query database. When a subscriber thereafter initiates a call from the target station, the switch receiving the call finds the ANI in its trigger table. As a result, a query is routed to the database, and information stored therein is used to give the target station the desired calling features and billing characterists in real time.

A mobile subscriber uses the present invention in three major steps: (1) service subscription and registration, by which a service profile is entered into the customer processing center describing the personalized calling features and billing characteristics and/or options that a subscriber wishes to associate with his/her outgoing calls; (2) activation of the service with respect to a particular target station, by virtue of which the characteristics of the target station are altered for a specified time interval, with the selected bills and service option, by updating the ANI trigger table and the query database, and (3) initiation of a call from the target station, such call having the selected special billing arrangements and/or custom features activated on a dynamic basis.

BRIEF DESCRIPTION OF THE DRAWINGS

The present invention will be more fully understood by reference to the following detailed description, when read in light of the accompanying drawing in which.

DETAILED DESCRIPTION

Figure 1:
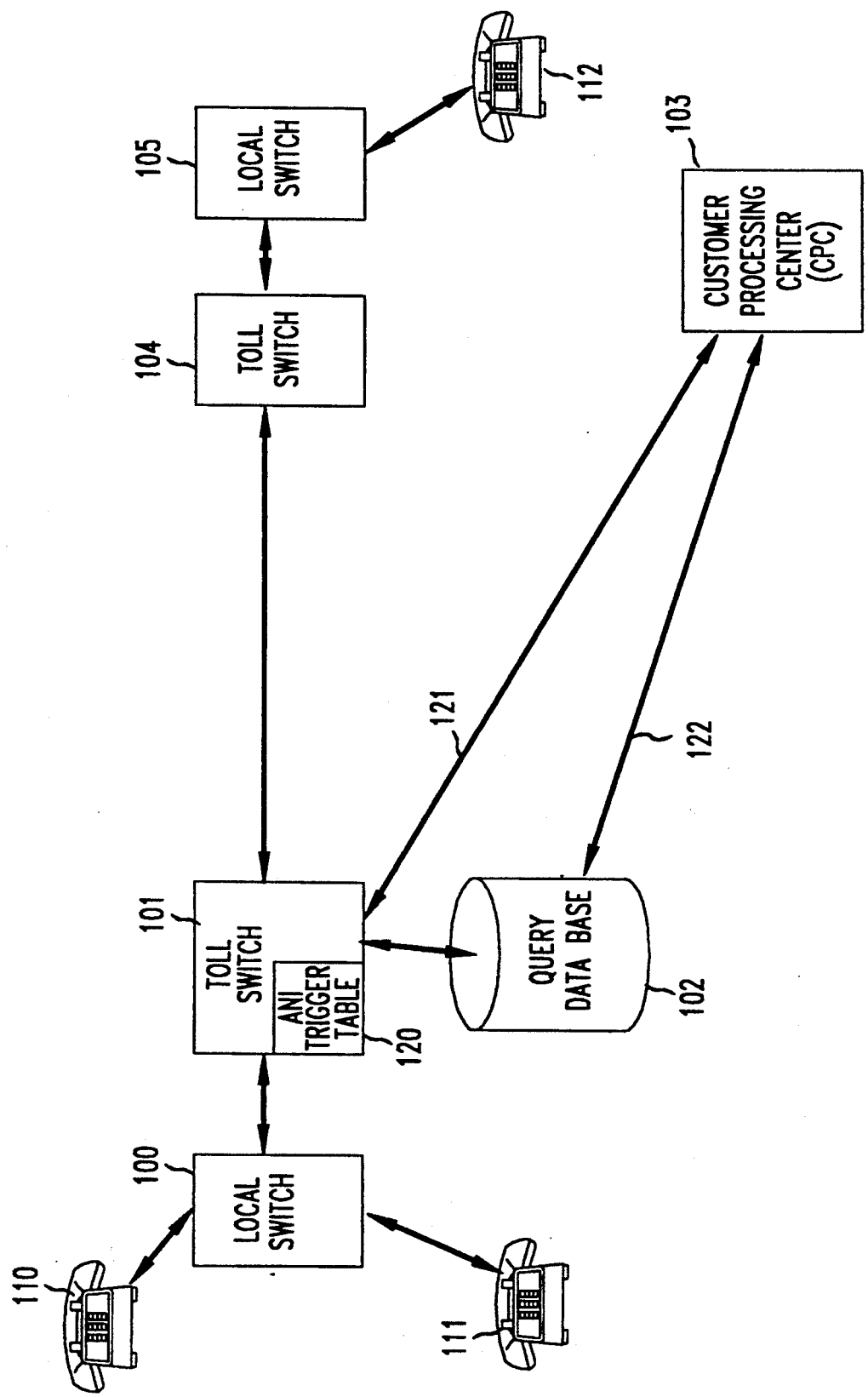
FIG. 1 is a block diagram illustrating the major components in the system of the present invention, by which the characteristics of outbound calls made from target stations can be quickly and easily changed.

Referring first to FIG. 1, there is shown a block diagram illustrating the major components in the system of the present invention, by which the characteristics of outbound calls made from selected telephones called "target stations" can be quickly and easily changed in real time. In FIG. 1, toll switch 101 is an intelligent electronic switching system such as an AT&T #4ESS(TM), that is arranged to route incoming calls originating from locations such as stations 110 and 111 that "home" on that switch to a plurality of remote destinations, such as station 112 reached via a second toll switch 104 and a local switch 105. Toll switch 101 is arranged to provide special calling features and to generate billing records resulting in special billing treatment, in accordance with stored data in the form of service profiles presented to the switch. An internal information storage and processing facility known as an ANI trigger table 120 in switch 101, is arranged to examine the ANI associated with each call routed to switch 101 to determine if the call requires special treatment, and to retrieve the appropriate service profile. Calls and associated ANI are presented to switch 101 via an originating local switch 100 which is typically operated by a Local Exchange Carrier (LEC). ANI trigger table 120 includes a list of ANIs (calling party numbers) and pointers that can be used to retrieve additional information associated with the ANI.

Figures 5, 6:
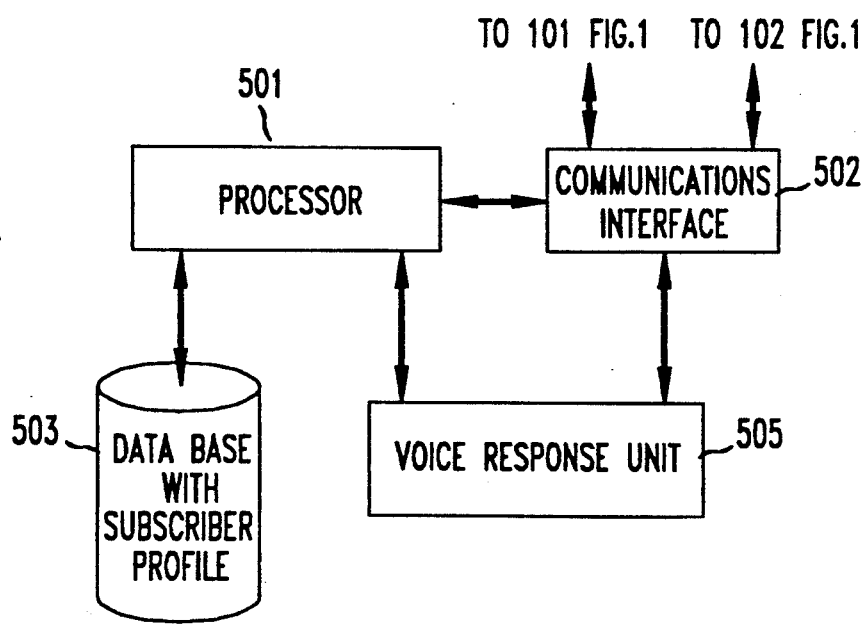
FIG. 5 illustrates one possible format for a subscriber service profile stored in CPC 103 and later in query database 102 of FIG. 1.
FIG. 6 is a block diagram illustrating one arrangement for customer processing center 103 of FIG. 1.

A query database 102 is associated with and connected to toll switch 101 and is arranged to store a plurality of service profiles, which are described in more detail in conjunction with FIG. 5. Each profile specifies attributes including special calling features and billing arrangements that are to be provided to calls received in switch 101 that originated in particular calling stations, such as stations 110 and 111. Database 102 may be part of toll switch 101 or may be a separate information storage and retrieval facility, such as a network control point (NCP). Detailed information describing a typical arrangement for an NCP, such as AT&T's 1A/1B NCP, is contained in AT&T publication 256-100-100AC. Queries directed to database 102 from toll switch 101, as well as information retrieved from database 102 and directed to toll switch 101, may be formatted and communicated using protocols like ISDN Q.931, TCAP, etc.

In accordance with the present invention, a customer processing center (CPC) 103, described more fully below in conjunction with FIG. 6, is arranged to process initial service requests received from subscribers so as to assemble a service profile for that subscriber, and thereafter receive and processing activation requests to designate particular telephones as target stations.

An initial service request is processed in CPC 103 by creating a service profile of the type illustrated in FIG. 5, and storing the profile until activation of a one or more particular target stations. As shown, each record includes an index field 400, which contains a unique identification number assigned to each subscriber and a personal identification number (PIN) used by the subscriber to thereafter activate specific target stations. Field 401 is initially empty at the time a service profile is created. When the service is activated, CPC 103 inserts in this field the telephone number of the target station, before the profile is transmitted to database 102.

Each profile also includes a plurality of fields such as fields 402-406 that contain information describing features that the subscriber desires to activate in a target station. This information is in the form of parameters and data necessary for switch 101 to provide the features when the record is retrieved and applied to that switch. For example, fields 402–406 may include data describing various calling features such as speed dialing, call pickup, outbound call screening, and various billing features, such as special account handling, etc.

The specific manner in which information is entered in service profiles can vary in different applications, depending upon the specific configuration of CPC 103. Preferably, CPC 103 includes an interactive voice response unit (VRU) such as an AT&T Conversant Voice Information System that is adapted to play announcements and collect digits and other information entered or otherwise provided by the caller. In this event, the service profile can be created using an automated process by which the subscriber is queried using the VRU, and the information entered by the subscriber via touch tone keys on a telephone instrument is thereafter captured in the VRU and written to a data record. Alternatively, information obtained from the subscriber can be processed using suitable translation algorithms in an offline processor, or a live operator can take the subscriber-provided information and create the profile. In any event, the creation and storage of service profiles is well understood, as illustrated by the database structure and feature validity fields shown in FIGS. 2 and 3 of the above-cited Lee patent, which may be used in connection with the present invention. It is also to be noted here that, in some situations, it may be advantageous for several target stations to have the same features and characteristics. In this event, provision may be made for using the same profile for many subscribers, using cross indexing and/or pointers.

Since information stored in database 102 can be effective to associate a particular target station with desired characteristics only during a designated time period, it is advantageous to also include in each record in database 102, information in fields 407 and 408 indicating a start and/or stop time and date during which the service is "active". The characteristics of the target station are changed only during the active interval. If no start time is contained in a record, it may be assumed that the change is to become effective immediately. If no stop time is contained in a record, it may be assumed that the change is to continue indefinitely. In either event, the profile may be modified by the subscriber to start and/or stop the activation of the service at any time.

When a subscriber desires to activate the service provided by the present invention to, for example, designate station 111 as a target station, a call may be initiated from any telephone station, such as station 110, to CPC 103. CPC 103 may be assigned an 800 number, in order to allow subscribers to access the service on a toll free basis. Although FIG. 1 shows stations 110 and 111 connected to and served by the same local switch 100, it is to be understood that this arrangement is shown for convenience of illustration, and that the present invention contemplates "target" and "home" stations served by separate and geographically distant local switches and toll switches. This is discussed more fully below.

Figure 2:
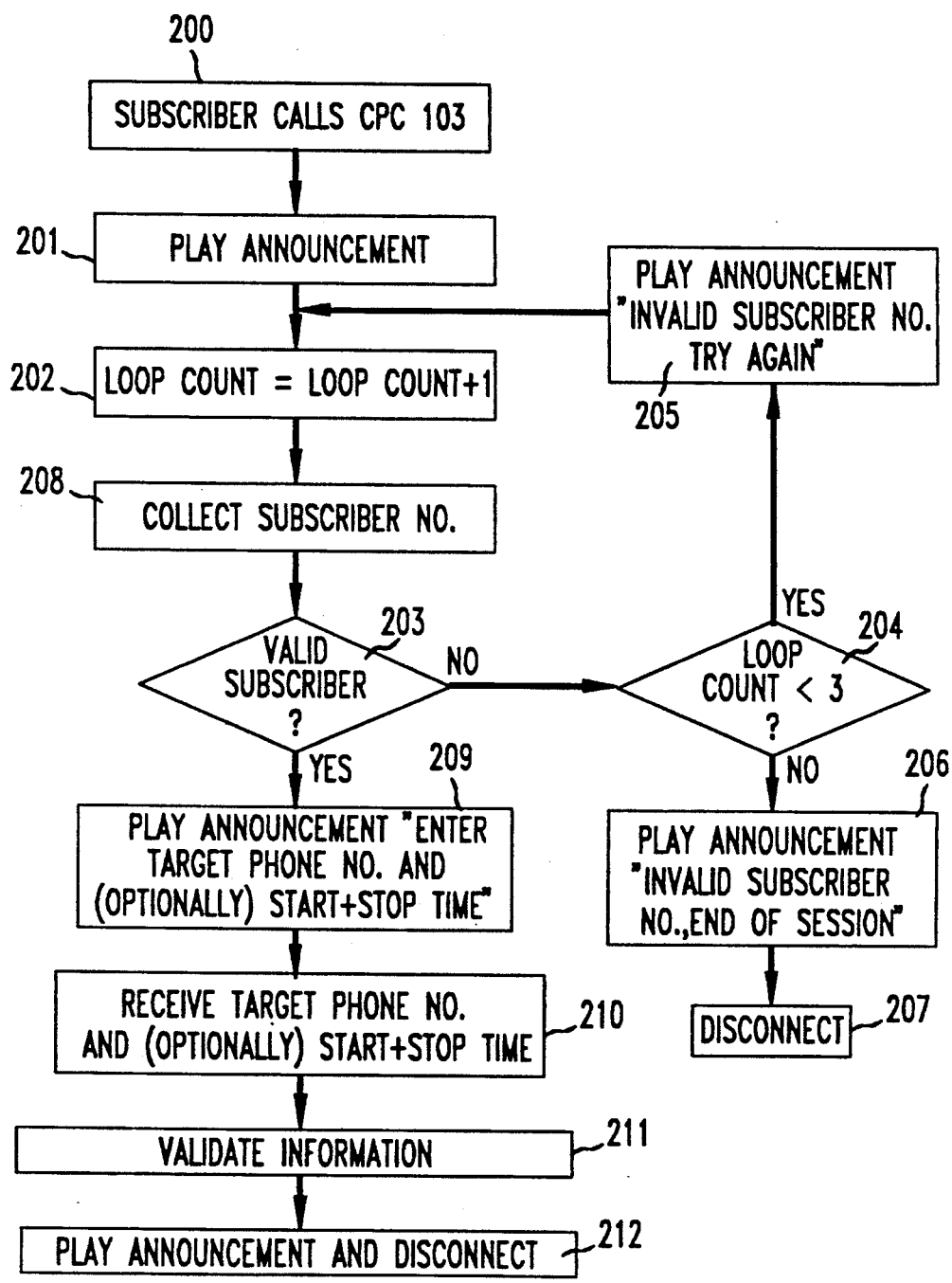
FIG. 2 is a flow diagram illustrating the steps followed in customer processing center (CPC) 103 of FIG. 1 to activate the service contemplated by the present invention.

The activation process followed in CPC 103 upon receipt of a call from a subscriber (step 200) is illustrated in flow diagram form in FIG. 2. In step 201, CPC 103 plays an announcement to the caller, requesting that the caller enter the unique PIN assigned to the subscriber during the initial service request process described above. As stated previously, this PIN indicates authorization to access the service. The PIN may be entered by the subscriber in several ways, but is typically provided by depressing touch tone buttons on the calling station. Alternatively, the identity of the subscriber can be determined and verified by use of a credit card reader or by speech recognition circuitry. CPC 103 may also query the subscriber to obtain credit information needed to bill the subscriber for the service, if a separate charge is imposed for each service activation.

After the announcement is played in step 201, the count in an initially zeroed loop counter is incremented in step 202, and the subscriber-entered information is collected (step 208) and evaluated in step 203, by comparing the information with information stored in field 400 of the record of FIG. 5. If the subscriber number, PIN or other information is not determined to be valid, and the count in the loop counter is determined (step 204) to be less than a fixed number, illustratively 3, an announcement is played in step 205 requesting the subscriber to enter the requested information again, and steps 202, 208 and 203 are repeated. If it is determined in step 204 that three unsuccessful attempts at information entry have already been made, a different announcement may be played in step 206, requesting the subscriber to place a call to an attendant to get help. In such event, the call is disconnected in step 207.

If the subscriber information and PIN are determined to be valid in step 203, an announcement is played to the subscriber in step 209, requesting the subscriber to identify the telephone number of the "target station" for which the characteristics are to be changed, and as an option, the start and stop times during which the changes are to be effective. The requested information may again be entered by means of the touch tone keys available on most telephone instruments, from a keyboard, or in other ways well known to those skilled in the art. In this example, the telephone number for target station 111 is assumed to be NPA-NXX-yyyy, where NPA represents what is commonly called the area code, NXX represents the local exchange associated with the target station, and yyyy are four arbitrary digits that together with the other information uniquely identify the target station. If desired, start and stop times need not be specified. In such event, the service will be activated immediately and remain active until subsequently canceled.

Information entered by the subscriber in response to the announcement is collected in step 210 and validated in step 211, before it is entered in the appropriate fields in the subscriber's profile already stored in CPC 103. In this context, validation may include examination of the subscriber entered information to insure "legal" start and stop times (as a function of the present time), valid area code and exchange for the target station, etc. If the information is determined to be valid, the telephone number of the target station is entered in field 401, and the start and stop times, if input by the subscriber, are entered in fields 407 and 408, respectively. The activation process is completed in step 212 by playing an announcement to the subscriber and disconnecting the call. In the event that invalid data is detected, the subscriber may be prompted in additional steps, not shown, to re-enter the correct information.

Figure 3:
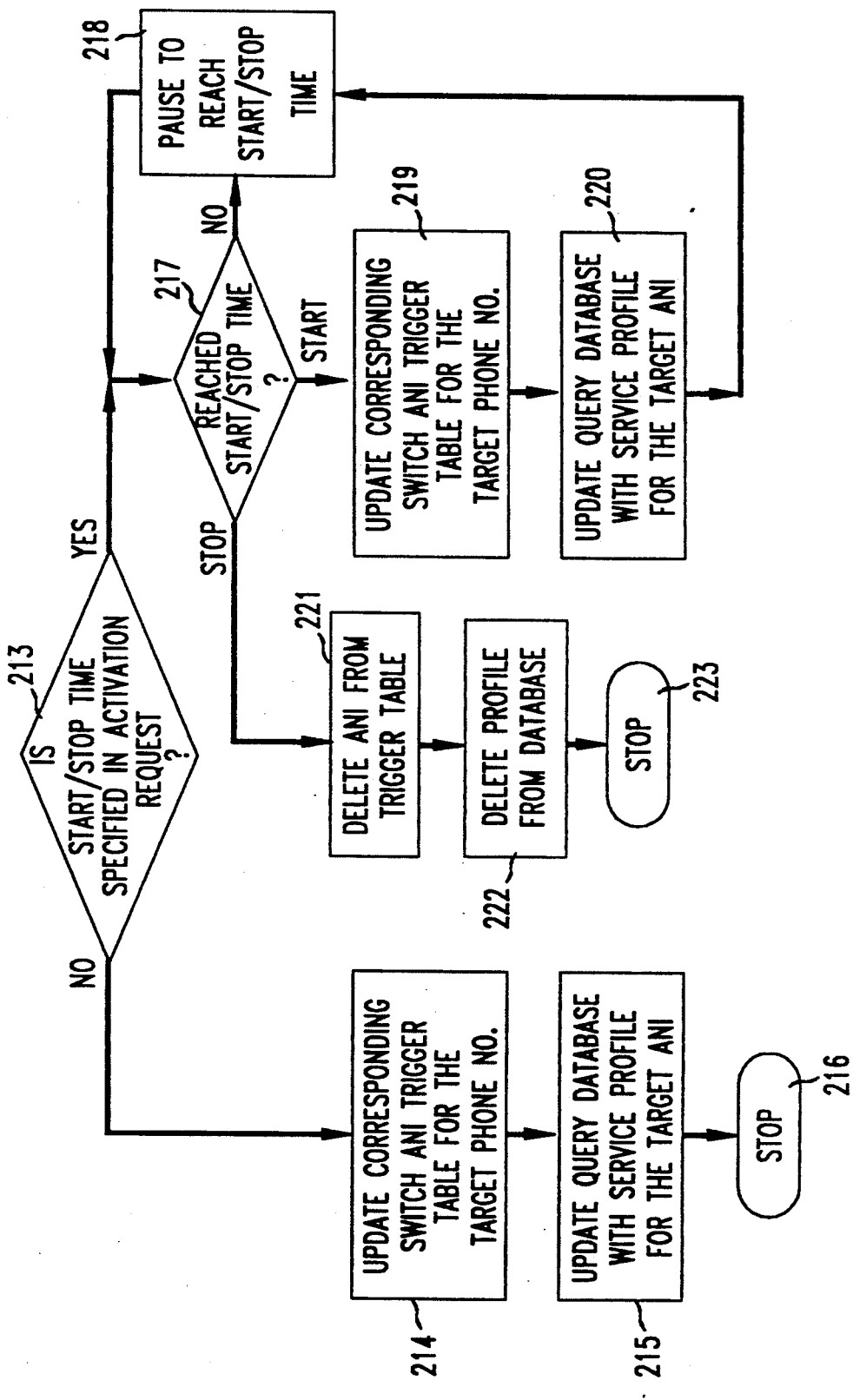
FIG. 3 is a flow diagram illustrating the steps followed in CPC 103 after activation, in order to change the characteristics of a target station.

After activation as shown in FIG. 2 is complete, the process illustrated in FIG. 3 is performed in CPC 103 in order to effectuate the desired changes in call characteristics. In step 213, the information entered by the subscriber and collected in step 210 is examined to determine if a specific start or stop time has been specified by the subscriber. If so, the time specified is compared to the current time in step 217, to determine if the start time has been reached. If not, the process in CPC 103 with respect to this subscriber is paused in step 218 until the start time has been reached. When step 217 is repeated at that time, processing in steps 219 and 220, described more fully below, will occur.

If a negative result is reached in step 213, immediate activation is necessary, leading to the processing in steps 214 and 215. These steps are identical to steps 219 and 220, respectively. In step 214, ANI trigger table 120 in the toll switch on which the target station "homes" (in this example, toll switch 101) is updated by adding the ANI that will be received when a call is originated from the target station. More specifically, an ANI trigger table update message is formulated in and sent from CPC 103 to the appropriate toll switch such as toll switch 101 using either Transaction Capabilities Application Port (TCAP) or ISDN Q.931 protocols. The message, which includes the ANI to be added to the trigger table as well as the identity of the appropriate toll switch on which the target station homes, is transmitted to the toll switch via a communications link 121, which may include elements of a separate CCS7 signaling network. The identity of the appropriate toll switch (e.g., toll switch 101) is determined in CPC by a table look-up, which associates the first six digits (NPA-NXX), i.e., the area code and local office exchange of the target station telephone number stored in field 401, with a particular toll switch on which the target station is homed.

In step 215, the service profile for the subscriber stored in CPC 103 is retrieved, transmitted to, and stored in the database (i.e., database 102) associated with the toll switch on which the target station is homed. The profile may be transmitted to database 102 directly over a communications link 122, or may alternatively be sent to toll switch 101 on line 121 and then entered in the database. After step 215 is completed, the process is stopped in step 216.

If start and stop times have been specified by the subscriber upon completion of updating in steps 219 and 220, the process is again paused in step 218 until the desired stop time is reached. When step 217 is repeated at that time, steps 221 and 222 are processed to essentially "undo" the actions taken in steps 219 and 220, respectively. More specifically, in step 221, a message is sent to switch 101 to remove from ANI trigger table 120 the ANI associated with the target station. In step 222, a message is transmitted to database 102, removing the profile previously stored for the target station. The process is then stopped in step 223. Note that if no start/stop time is specified there, changes put into effect can be canceled by overwriting the record in database 102. This can be done via a separate call to CPC 103.

To insure reliability, both switch 101 and database 102 may be arranged to acknowledge receipt of both the ANI and profile information (either activation or deactivation) by signaling CPC 103 with an acknowledgement message. If the acknowledgement is not received, no further processing is required. If an acknowledgement is not received within a predetermined time interval, steps 214, 215 or 219, 220 can be repeated as necessary. This arrangement is purely optional, and is thus not shown in FIG. 3.

Persons knowledgeable in the field of database administration and call processing will perceive various modifications that may be made to the processes illustrated in FIGS. 2 and 3 as well as in the organization of records illustrated in FIG. 5 that are stored in database 102, without departing from the intended arrangement of the present invention. For example, it may be desirable to permit a subscriber to activate only one phone at a time for the service, in which case any subsequent call for activation can be arranged to cancel any previous activation. Otherwise, activation is only canceled with a deactivation call.

Figure 4:
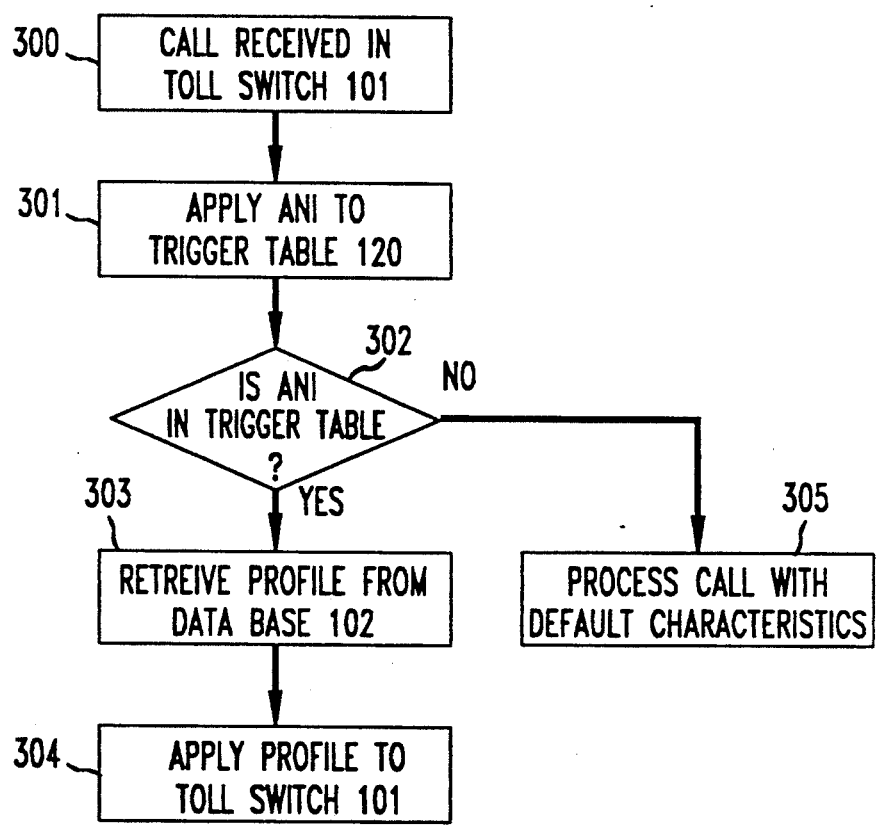
FIG. 4 is a flow diagram illustrating the steps followed when a call is made from a target station having "changed" characteristics.

FIG. 4 is a flow diagram illustrating the steps followed when a mobile subscriber is away from his/her base location and desires to make a call from a target station. When a call is received in the toll switch on which the target station homes (i.e., toll switch 101) from target station 111 (step 300), the associated ANI for station 111, originated in local switch 100, is applied to trigger table 120 in step 301 to determine in step 302 if database 102 is to be queried. If so, the appropriate profile for target station 111 is retrieved (step 303) and transmitted to toll switch 101 (step 304). Because of the intelligence built into the switch, this information characterizes the nature of the calling and billing features that are provided to the caller making that call. It is to be noted, however, that the ANI of the target station is not itself changed, so that there is no inconsistency created in toll switch 101. Thus, the call can be properly rated in terms of its true originating location. If it is determined in step 302 that the calling station's ANI is not in trigger table 120, the call is processed (step 305) using default characteristics.

FIG. 6 is a block diagram illustrating one arrangement for customer processing center (CPC 103) of FIG. 1. The processing center includes a processor 501 which may be a personal computer such as AT&T Model 6386 WGS, which has an associated database 503 which contains subscriber profiles. Interconnected with processor 501 is a communications interface 502 which communicates with toll switch 101 and query database 102, if that database is not part of the switch. A VRU 505, such as the Conversant Voice Information System, is also connected to processor 501 and to interface 502. When an initial service request is received in CPC 103, information in the request is provided to processor 501 via interface 502, and triggers a first interactive "script" in VRU 505, querying the caller for information needed to formulate a profile and store it in database 503. Thereafter, an activation or deactivation request received in CPC 103 is passed through communications interface 502 to processor 501, initiating a second interactive script in VRU 505, which queries the subscriber for information identifying the subscriber and the identity of a desired target station and optionally, service start/stop times. This information is collected in VRU 505 and entered in the subscriber's profile in database 503, under the control of processor 501. Finally, ANI trigger table 120 is updated with respect to the desired target station and the subscriber's profile is entered in database 102, both under the control of processor 501, which transmits signaling messages to switch 101 via interface 502.

Various modifications and adaptations may be made to the present invention. For this reason, it is intended that the invention be limited only by the following claims.

We claim:

1. In a telecommunications system, apparatus for altering the features provided to outbound telephone calls originating from a target station and routed to a destination via a switch, said apparatus comprising:

a database arranged to store a record indicative of the features to be applied to calls originated from said target station and processed in said switch, means in said switch responsive to automatic number identification (ANI) information associated with a call originated from said target station for retrieving said record from said database and applying said features to said call, and means for updating said record in said database in response to a call initiated from a station other than said target station.

2. The invention defined in claim 1 wherein said features include dialing attributes of said call originated from said target station.

3. The invention defined in claim 1 wherein said switch includes means for formulating a billing record for said call, and said features include attributes specified in said billing record.

4. The invention defined in claim 1 wherein said retrieving and applying means is arranged to retain the ANI associated with said target station.

5. The invention defined in claim 1 wherein said updating means includes means for identifying said switch from among a plurality of switches based upon selected digits in the telephone number of said target station.

6. In a telecommunications system, apparatus for altering the characteristics of outbound telephone calls originated in one of a plurality of target stations and routed to a destination via a telecommunications network including a plurality of switches, each of said target stations being homed on a particular one of said switches, said apparatus comprising:

means for storing a plurality of records, each record indicative of the characteristics to be applied to calls processed in said switches;

means for transferring, in response to a call initiated from a location remote from a particular one of said target stations, one of said records to the one of said switches on which said one target station is homed; and means in each of said switches including an ANI trigger table responsive to ANI information in a call originated from said target station, for applying characteristics to said call in accordance with said transferred one of said stored records.

7. The invention defined in claim 6 wherein said transferring means includes means for identifying said one of said switches based upon selected digits in the telephone number of said particular one of said target stations.

8. A system for customizing billing records generated in connection with telephone calls originating from a particular telephone instrument, said particular telephone instrument being connected to a toll switch in a communication network via a local switch, said local switch arranged to pass an indication of the origination number of said particular telephone instrument to said toll switch, said system comprising:

a trigger table in said toll switch arranged to generate a query in response to receipt of a telephone call from a particular telephone instrument only if the origination number of said particular telephone instrument is stored in said trigger table;

a database for retrieving and applying to said toll switch, in response to said query, a particular one of a plurality of records stored in said database, said record indicating the characteristics to be applied to billing records generated in connection with said telephone call; and means for updating from a remote location, originating numbers stored in said trigger table and records stored in said database.

9. A system for generating a billing record for a long distance call originated in a telephone station and routed to destination via a toll switch, said system comprising:

a database for storing profiles containing information indicative of desired billing characteristics to be applied to long distance calls;

means for retrieving one of said profiles from said database in response to receipt of a call originated from said telephone station, said one profile being selected as a function of the telephone number of said telephone station;

means in said toll switch for receiving said retrieved profile, and responsive thereto for generating a billing record for said long distance call having said desired billing characteristics.

10. Apparatus for customizing calling characteristics for calls placed by subscriber from a telephone station and routed through a telecommunications network including a plurality of intelligent switches, said apparatus comprising:

database means for storing a profile containing desired calling characteristics for said subscriber;

means responsive to designation of a particular telephone station by said subscriber for transferring said profile to a selected one of said switches on which said particular station is homed; and means including an ANI trigger table in said selected switch for accessing said transferred profile in response to a call originated in said particular telephone station so as to complete calls made from said particular telephone station in accordance with characteristics contained in said profile.

11. In a telecommunications system, a method for altering the features provided to outbound telephone calls originating from a target station and routed to a destination via a switch, said method comprising the steps of:

storing in a database a record indicative of the features to be applied to calls originated from said target station and processed in said switch, retrieving said record from said database in response to automatic number identification (ANI) information associated with a call originated from said target station;

applying characteristics to said call as specified in said retrieved record, and updating said record in said database in response to a call initiated from a station other than said target station.

12. The method defined in claim 11 wherein said features include dialing attributes of said call originated from said target station.

13. The method defined in claim 11 wherein said applying step includes formulating a billing record for said call, and wherein said features include attributes specified in said billing record.

14. The method defined in claim 11 wherein said applying step includes retaining the ANI associated with said target station.

15. The method defined in claim 11 wherein said updating step includes identifying said switch from among a plurality of switches based upon selected digits in the telephone number of said target station.

16. In a telecommunications system, a method for altering the characteristics of outbound telephone calls originated in one of a plurality of target stations and routed to a destination via a telecommunications network including a plurality of switches, each of said target stations being homed on a particular one of said switches, said method comprising the steps of:

storing a plurality of records, each record indicative of the characteristics to be applied to calls processed in said switches;

transferring, in response to a call initiated from a location remote from a particular one of said target stations, one of said records to the one of said switches on which said one target station is homed; and responsive to ANI information in a call originated from said target station, processing said call in said one of said switches on which said one target station is homed in accordance with characteristics specified in said transferred one of said stored records.

17. The method defined in claim 16 wherein said transferring step includes identifying said one of said switches based upon selected digits in the telephone number of said particular one of said target stations.

18. A method for customizing billing records generated in connection with telephone calls originating from a particular telephone instrument, said particular telephone instrument being connected to a toll switch in a communications network via a local switch, said local switch arranged to pass an indication of the origination number of said particular telephone instrument to a trigger table in said toll switch, said method comprising:

generating a query in response to receipt of a telephone call from a particular telephone instrument only if the origination number of said particular telephone instrument is stored in said trigger table;

retrieving and applying to said toll switch, in response to said query, a particular one of a plurality of profiles stored in a database, said particular profile indicating the characteristics to be applied to billing records generated in connection with said telephone call;

generating a billing record in said toll switch in accordance with information contained in said particular one of said profiles; and periodically updating from a remote location, originating numbers stored in said trigger table and profiles stored in said database.

19. A method for generating a billing record for a long distance call originated in a telephone station and routed to a destination via a toll switch, said system comprising:

storing in a database, profiles containing information indicative of desired billing characteristics to be applied to long distance calls;

retrieving one of said profiles from said database in response to receipt of a call originated from said telephone station, said one profile being selected as a function of the telephone number of said telephone station; and processing said retrieved profile in said toll switch so as to generate a billing record for said long distance call having said desired billing characteristics.

20. A method of customizing calling characteristics for calls placed by a subscriber from a telephone station and routed through a telecommunications network including a plurality of intelligent switches, said method comprising:

storing in a database, a profile containing desired calling characteristics for said subscriber;

transferring said profile, in response to designation of a particular telephone station by said subscriber, to a selected one of said switches on which said particular station is homed; and processing information contained in said profile in said selected switch so as to service calls made from said particular telephone station in accordance with characteristics contained in said profile.

* * * * *